United States Patent
Lee et al.

(10) Patent No.: US 7,729,466 B2
(45) Date of Patent: Jun. 1, 2010

(54) NICAM SYSTEM AND SYMBOL RATE CONVERSION METHOD THEREOF

(75) Inventors: Kai-Ting Lee, Tainan County (TW); Tien-Ju Tsai, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 348 days.

(21) Appl. No.: 11/892,514

(22) Filed: Aug. 23, 2007

(65) Prior Publication Data

US 2009/0052558 A1    Feb. 26, 2009

(51) Int. Cl.
*H04L 25/17* (2006.01)
(52) U.S. Cl. .................. 375/372; 375/242; 348/E5.124
(58) Field of Classification Search .................. 375/242, 375/372, 377; 348/E5.124
See application file for complete search history.

(56) References Cited

U.S. PATENT DOCUMENTS

| | | | |
|---|---|---|---|
| 5,138,457 A * | 8/1992 | Sakai et al. | 348/738 |
| 2007/0165762 A1 * | 7/2007 | Darr et al. | 375/372 |

* cited by examiner

*Primary Examiner*—Shuwang Liu
*Assistant Examiner*—David Huang
(74) *Attorney, Agent, or Firm*—Rabin & Berdo, P.C.

(57) ABSTRACT

A NICAM system includes a NICAM deframer, a FIFO buffer and a symbol rate conversion (SRC) unit. The NICAM deframer obtains multiple deinterleaved symbols according to a strobe signal and a data signal in each timing and expands the deinterleaved symbols to corresponding multiple pulse code modulation (PCM) symbols. The FIFO buffer temporarily stores the symbols and outputs the PCM symbols at a local timing, rate. The SRC unit determines whether a SRC function is enabled according to the statuses of the symbols in the FIFO buffer every a constant time interval. When the SRC function is enabled, the SRC unit interpolates the PCM symbols to obtain multiple new PCM symbols and outputs the new PCM symbols at the local timing rate.

22 Claims, 5 Drawing Sheets

200

NICAM SYSTEM AND SYMBOL RATE CONVERSION METHOD THEREOF

BACKGROUND OF THE INVENTION

1. Field of the Invention

The invention relates in general to a near-instantaneously companded audio multiplex (NICAM) system and a symbol rate conversion (SRC) method thereof, and more particularly to a NICAM system and a SRC method capable of preventing the overflow and the underrun from happening.

2. Description of the Related Art

A NICAM system is a television broadcast system released by the British Broadcasting Corporation (BBS) and is adopted by so many countries. FIG. 1 (Prior Art) is a schematic illustration showing a conventional NICAM system. The NICAM system 100 includes square root raised cosine (SRRC) filters 102 and 104, a symbol timing recovery unit 106, a differential quadrature phase shift keying (DQPSK) decoder 108, a NICAM deframer 110, a first-in-first-out (FIFO) buffer 112, a digital loop filter 114 and a voltage controlled crystal oscillator (VCXO) 116.

The NICAM system 100 receives an audio signal outputted from a transmitter. The audio signal includes an in-phase signal I and a quadrature signal Q. The symbol timing recovery unit 106 samples the in-phase signal I and the quadrature signal Q, and then the DQPSK decoder 108 decodes the sampled signals to obtain a data signal Data and a strobe signal S. The NICAM deframer 110 decodes to generate multiple symbols according to the data signal Data and the strobe signal S at each timing and temporarily stores the symbols to the FIFO buffer 112. Then, the FIFO buffer 112 outputs the symbols at a local timing rate.

The rate at which the NICAM deframer 110 decodes to generate the symbols is actually a transmission timing rate of the transmitter, which may be different from the local timing rate at an output terminal of the FIFO buffer 112. If the transmission timing rate is higher than the local timing rate, the FIFO buffer 112 may generate the overflow. If the transmission timing rate is lower than the local timing rate, the FIFO buffer 112 may generate the underrun.

Thus, the conventional NICAM system 100 makes the VCXO 116 generate a local clock LC the same as the local timing rate through the symbol timing recovery unit 106 and the digital loop filter 114, and adjusts the rate at which the NICAM deframer 110 decodes to generate the symbols according to the local clock LC so that the rate is equal to the local timing rate. However, the VCXO 116 occupies a larger area, thereby increasing the cost. In addition, the audio signal outputted from the transmitter is an analog signal, and the symbol outputted from the FIFO buffer 112 is a digital signal. Consequently, the VCXO 116 has to match the transmission timing rate of the analog signal with the local timing rate of the digital signal in a complicated manner.

SUMMARY OF THE INVENTION

The invention is directed to a NICAM system and a SRC method thereof, wherein the NICAM system is free from the problems of the overflow and the underrun using this SRC method.

According to a first aspect of the present invention, a NICAM system including a NICAM deframer, a FIFO buffer and a SRC unit is provided. The NICAM deframer receives a strobe signal and a data signal, obtains a plurality of deinterleaved symbols at each timing according to the strobe signal and the data signal, and then expands the deinterleaved symbols into a plurality of corresponding pulse code modulation (PCM) symbols. The FIFO buffer temporarily stores the deinterleaved symbols and the PCM symbols and sequentially outputs the PCM symbols at a local timing rate. The SRC unit is coupled to the FIFO buffer and determines whether to enable a SRC function or not according to statuses of the symbols in the FIFO buffer every one constant time interval. The SRC unit outputs the PCM symbols at the local timing rate when the SRC function is disabled. When the SRC function is enabled, the SRC unit interpolates the PCM symbols to obtain a plurality of new PCM symbols and outputs the new PCM symbols at the local timing rate.

According to a second aspect of the present invention, a SRC method of a NICAM system is provided. The method includes the following steps. First, a strobe signal and a data signal are received. Then, a plurality of deinterleaved symbols is obtained according to the strobe signal and the data signal at each timing, and the deinterleaved symbols are sequentially stored in a deinterleaving area of a FIFO buffer. Next, the deinterleaved symbols are expanded into a plurality of corresponding pulse code modulation (PCM) symbols and the PCM symbols are temporarily stored in a PCM area of the FIFO buffer at a time. Then, the PCM symbols are outputted from the FIFO buffer at a local timing rate. Next, it is determined whether to enable a SRC function according to statuses of the symbols in the FIFO buffer every one constant time interval. Then, the PCM symbols are outputted at the local timing rate when the SRC function is disabled. Finally, the PCM symbols are interpolated to obtain a plurality of new PCM symbols when the SRC function is enabled, and the new PCM symbols are outputted at the local timing rate.

The invention will become apparent from the following detailed description of the preferred but non-limiting embodiments. The following description is made with reference to the accompanying drawings.

DETAILED DESCRIPTION OF THE INVENTION

The invention provides a near-instantaneously companded audio multiplex (NICAM) system and a symbol rate conversion (SRC) method thereof, wherein a SRC unit is attached after a first-in-first-out (FIFO) buffer of the NICAM system to prevent the NICAM system from encountering the problems of the overflow and the underrun.

Figure 1:
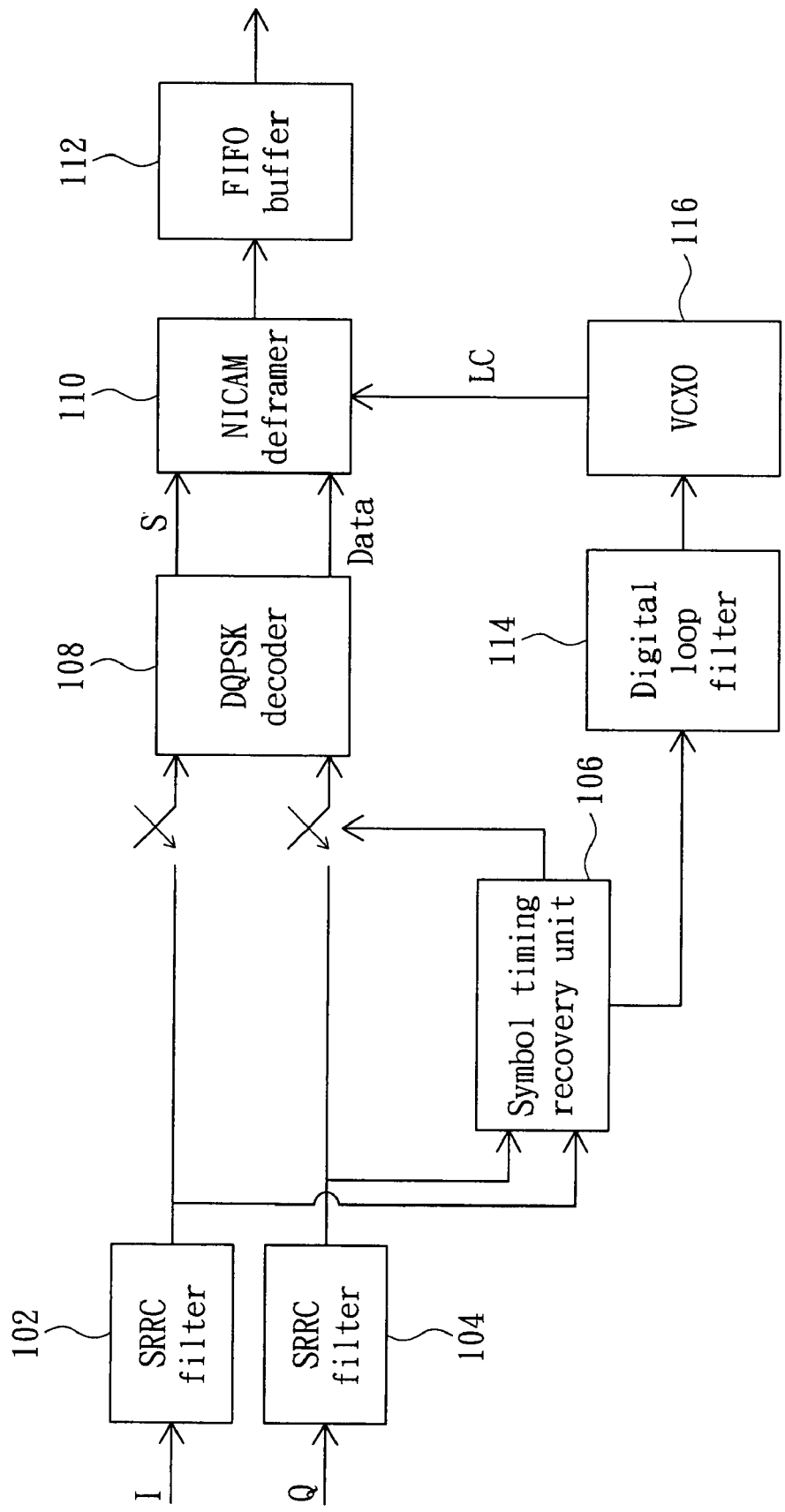
FIG. 1 (Prior Art) is a schematic illustration showing a conventional NICAM system.
Figure 2:
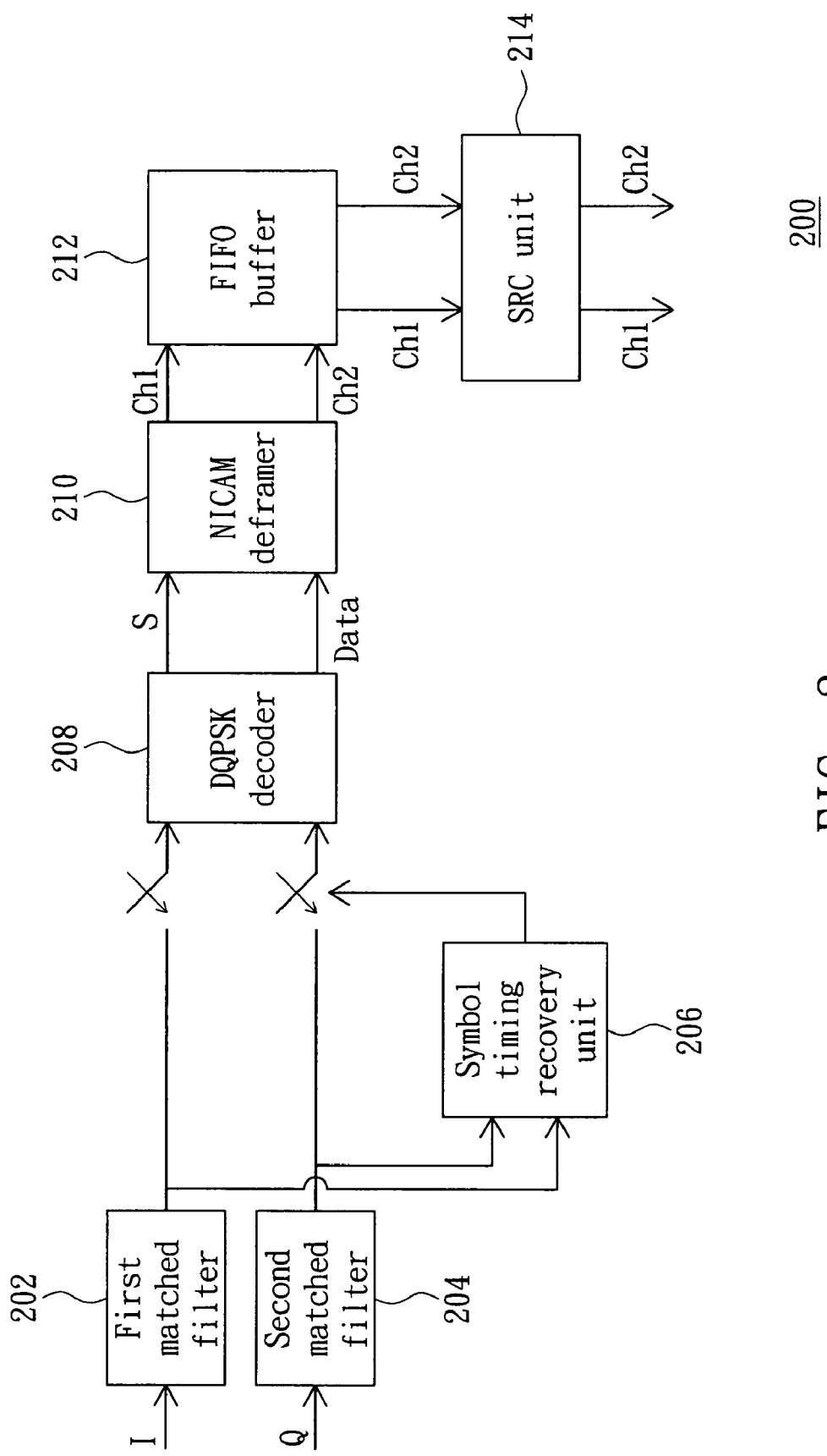
FIG. 2 is a schematic illustration showing a NICAM system according to a preferred embodiment of the invention.

FIG. 2 is a schematic illustration showing a NICAM system 200 according to a preferred embodiment of the invention. Referring to FIG. 2, the NICAM system 200 includes a first matched filter 202, a second matched filter 204, a symbol timing recovery unit 206, a differential quadrature phase shift keying (DQPSK) decoder 208, a NICAM deframer 210, a FIFO buffer 212 and a SRC unit 214.

The NICAM system 200 receives an audio signal from a transmitter. The audio signal includes an in-phase signal I and a quadrature signal Q. The first matched filter 202 receives the in-phase signal I and the second matched filter 204 receives the quadrature signal Q. The first matched filter 202 and the second matched filter 204, such as square root raised cosine (SRRC) filters, have impulse responses matching with the impulse response of the audio signal.

The symbol timing recovery unit 206 is coupled to the first matched filter 202 and the second matched filter 204, and samples the in-phase signal I and the quadrature signal Q at a symbol rate to obtain the best behaviors and thus to obtain a digital in-phase signal and a digital quadrature signal. The DQPSK decoder 208 decodes the digital in-phase signal and the digital quadrature signal to obtain a strobe signal S and a data signal Data, both of which pertain to DQPSK signals.

Figure 3:
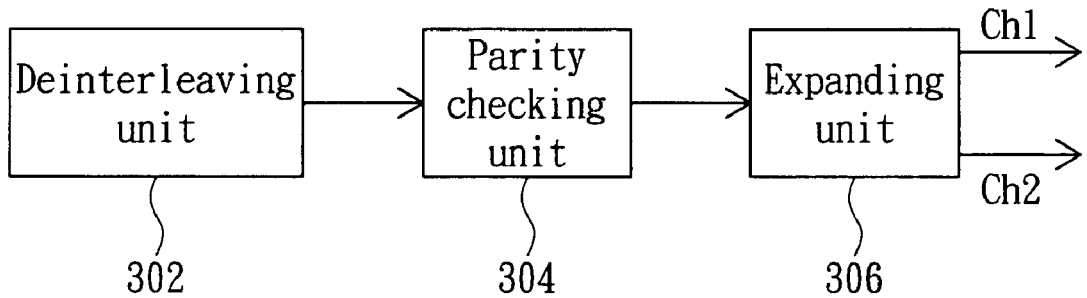
FIG. 3 is a block diagram showing a NICAM deframer 210 according to the preferred embodiment of the invention.
Figure 4:
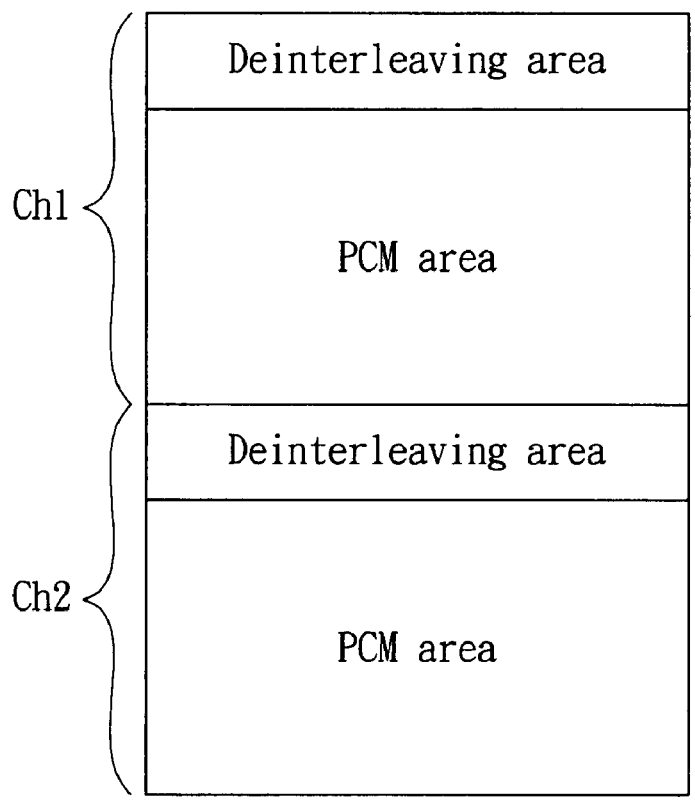
FIG. 4 is a schematic illustration showing a FIFO buffer 212 according to the preferred embodiment of the invention.

The NICAM deframer 210 receives the strobe signal S and the data signal Data. FIG. 3 is a block diagram showing the NICAM deframer 210 according to the preferred embodiment of the invention. FIG. 4 is a schematic illustration showing the FIFO buffer 212 according to the preferred embodiment of the invention. Referring to FIGS. 3 and 4, the NICAM deframer 210 includes a deinterleaving unit 302, a parity checking unit 304 and an expanding unit 306. Next, the NICAM deframer 210 receiving 728 bits of data every millisecond according to the strobe signal S and the data signal Data will be illustrated as an example.

Exclusive of the header data of the 728 bits of data, the deinterleaving unit 302 receives 704 bits of data every millisecond. The 704 bits of data are present in the form of 64 deinterleaved symbols, and each deinterleaved symbol includes 11 bits of data. The NICAM deframer 210 sequentially and temporarily stores the deinterleaved symbols in a deinterleaving area of the FIFO buffer 212. In order to simplify the circuit implementation, data transmission is performed through two channels ch1 and ch2. Each channel sequentially transmits 32 deinterleaved symbols.

The parity checking unit 304 checks the deinterleaved symbols to ensure the data correctness. The expanding unit 306 expands the 64 deinterleaved symbols into corresponding 64 pulse code modulation (PCM) symbols each including 14 bits of data. Then, the NICAM deframer 210 temporarily stores the 64 PCM symbols in the corresponding PCM area in the FIFO buffer 212 through the channels ch1 and ch2. Thereafter, the FIFO buffer 212 outputs the PCM symbols at a local timing rate, such as the 32 PCM symbols every millisecond in every channel.

The SRC unit 214 is coupled to the FIFO buffer 212 and determines whether to enable a SRC function or not according to statuses of the symbols in the FIFO buffer 212 every a constant time interval. When the SRC function is disabled, the SRC unit 214 respectively outputs the 32 PCM symbols through each channel ch1 and ch2 at the local timing rate. When the SRC function is enabled, the SRC unit interpolates the PCM symbols to obtain multiple new PCM symbols, and outputs the new PCM symbols through the channels ch1 and ch2 at the local timing rate.

The SRC unit 214 can determine whether to enable the SRC function or not every a constant time interval according to the statuses of the deinterleaved symbols in the deinterleaving area. The NICAM deframer 210 temporarily stores the 32 PCM symbols in the corresponding PCM area through a single channel, so the last five bits of the address stored with the PCM symbols in the PCM area are "0". That is, when the last five bits of the address stored with the PCM symbols in the PCM area are "0", the time of 1 millisecond (i.e., one constant time interval) has elapsed. At this time, the SRC unit 214 determines whether the address stored with the deinterleaved symbols in the deinterleaving area is a predetermined address. Because the NICAM deframer 210 first stores the deinterleaved symbols to one fourth of the deinterleaving area when the deinterleaved symbols are sequentially and temporarily stored in the deinterleaving area, the predetermined address corresponds to one fourth of the deinterleaving area, for example.

When the address stored with the deinterleaved symbols in the deinterleaving area every the constant time interval is the predetermined address, it represents that the transmission timing rate of the transmitter is equal to the local timing rate, and the SRC unit 214 does not enable the SRC function and outputs the 32 PCM symbols every millisecond through each of the channels ch1 and ch2 at the local timing rate.

When the address stored with the deinterleaved symbols in the deinterleaving area every the constant time interval exceeds an upper bound address higher than the predetermined address, it represents that the transmission timing rate of the transmitter is higher than the local timing rate, and the FIFO buffer 212 may overflow. Thus, the SRC unit 214 enables the SRC function to interpolate the PCM symbols to obtain the new PCM symbols, which are fewer than the PCM symbols. For example, the 32 PCM symbols are interpolated to obtain 31 new PCM symbols. The interpolation method is not particularly restricted, and may be a method of skipping one PCM symbol, the cubic interpolation method, the polynomial interpolation method or the Lagrange interpolation method. Then, the SRC unit 214 outputs 32 PCM symbols every millisecond through each of the channels ch1 and ch2 at the local timing rate. Consequently, it is possible to avoid the overflow problem of the FIFO buffer 212.

When the address stored with the deinterleaved symbols in the deinterleaving area every the constant time interval does not reach a lower bound address lower than the predetermined address, it represents that the transmission timing rate of the transmitter is smaller than the local timing rate, and the FIFO buffer 212 may have the underrun. In this case, the SRC unit 214 enables the SRC function to interpolate the PCM symbols to obtain the new PCM symbols, which are more than the PCM symbols. For example, the 32 PCM symbols are interpolated to obtain 33 new PCM symbols. The interpolation method is not particularly restricted, and may be a method of inserting "0", the cubic interpolation method, the polynomial interpolation method or the Lagrange interpolation method. Then, the SRC unit 214 outputs 32 PCM symbols every millisecond through each of the channels ch1 and ch2 at the local timing rate. Consequently, it is possible to avoid the underrun problem of the FIFO buffer 212.

In addition, the SRC unit 214 may also determine whether to enable the SRC function or not every the constant time interval according to the total data length of the deinterleaved symbols and the PCM symbols in the FIFO buffer 212.

When the total data length of the deinterleaved symbols and the PCM symbols in the FIFO buffer 212 every constant time interval is equal to a predetermined data length, it represents that the transmission timing rate of the transmitter is equal to the local timing rate, and the SRC unit 214 does not enable the SRC function and outputs 32 PCM symbols every millisecond through each of the channels ch1 and ch2 at the local timing rate.

When the total data length of the deinterleaved symbols and the PCM symbols in the FIFO buffer 212 every the constant time interval exceeds an upper bound data length longer than the predetermined data length, it represents that the transmission timing rate of the transmitter is higher than the local timing rate, and the FIFO buffer 212 may have the overflow. In this case, the SRC unit 214 enables the SRC function to interpolate the PCM symbols to obtain the new PCM symbols, which are fewer than the PCM symbols. Then, the SRC unit 214 outputs 32 PCM symbols every millisecond through each of the channels ch1 and ch2 at the local timing rate. Consequently, it is possible to avoid the overflow problem of the FIFO buffer 212.

When the total data length of the deinterleaved symbols and the PCM symbols in the FIFO buffer 212 every the constant time interval does not reach a lower bound data length shorter than the predetermined data length, it represents that the transmission timing rate of the transmitter is lower than the local timing rate, and the FIFO buffer 212 may have the underrun. In this case, the SRC unit 214 enables the SRC function to interpolate the PCM symbols to obtain the new PCM symbols, which are more than the PCM symbols. Then, the SRC unit 214 outputs 32 PCM symbols every millisecond through each of the channels ch1 and ch2 at the local timing rate. Consequently, it is possible to prevent the underrun problem of the FIFO buffer 212.

Figure 5A:
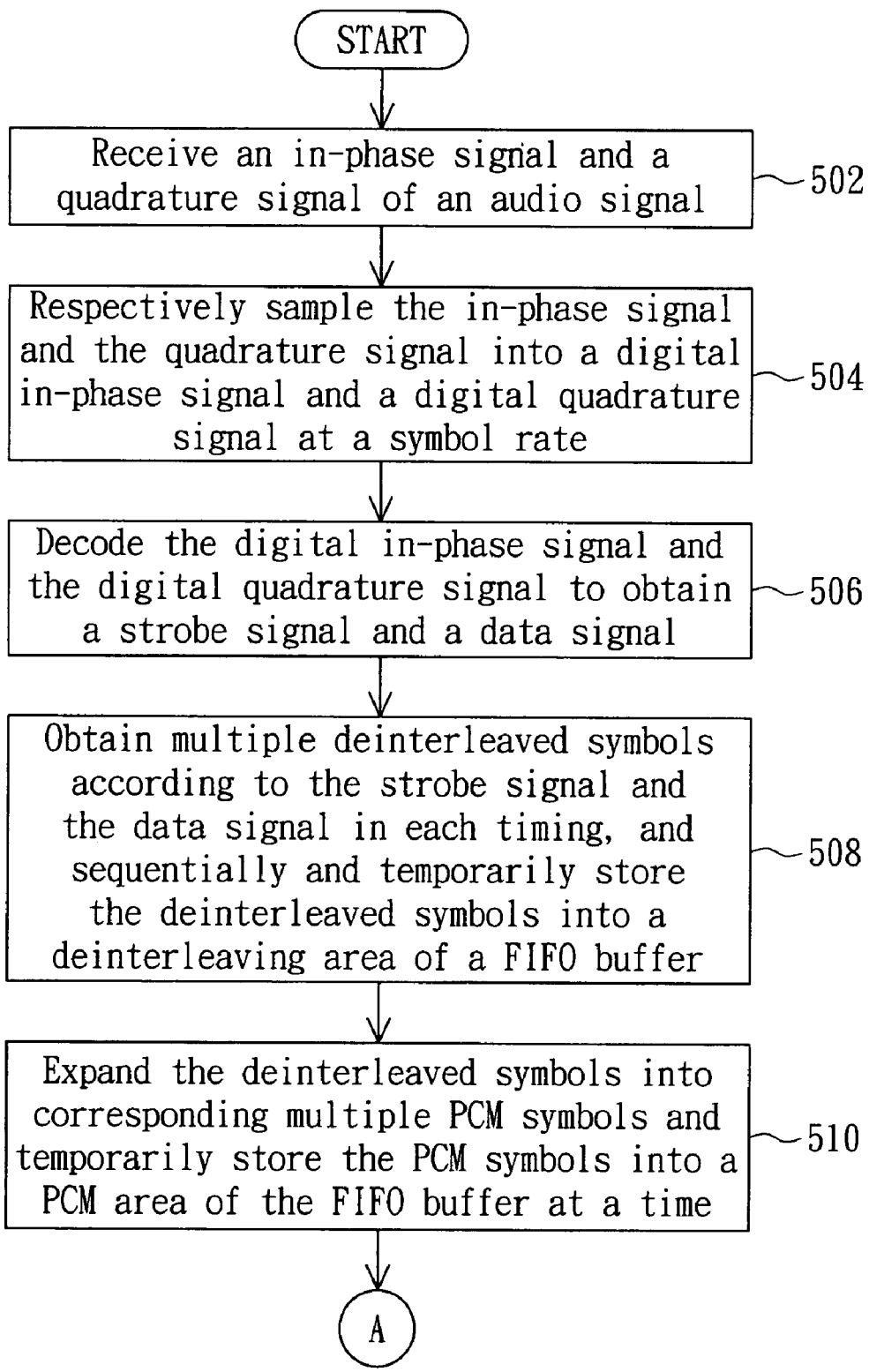
FIG. 5A and FIG. 5B are a flow chart showing a SRC method of the NICAM system according to the preferred embodiment of the invention.
Figure 5B:
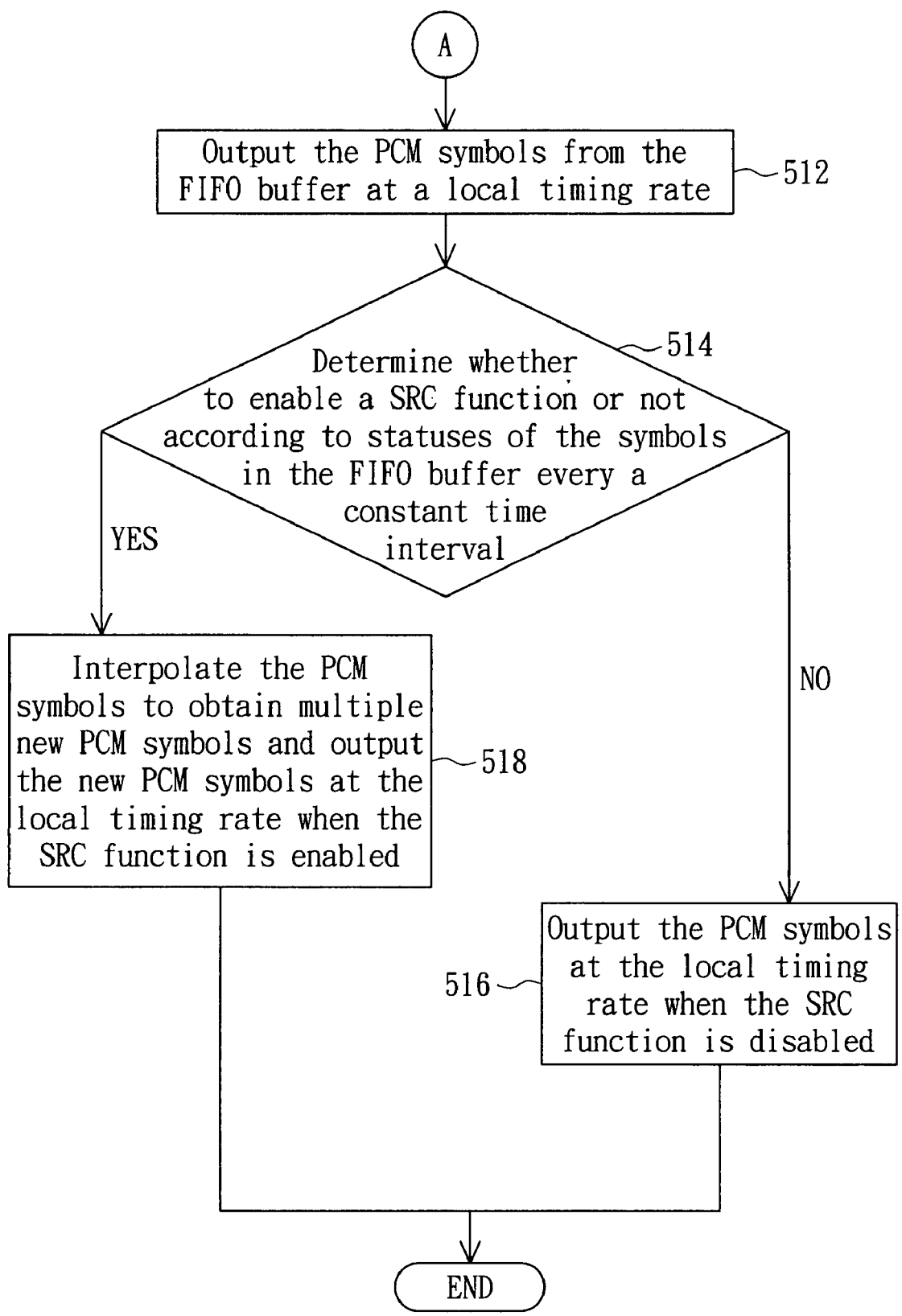

The invention also discloses a SRC method of the NICAM system. FIG. 5A and FIG. 5B are a flow chart showing the SRC method of the NICAM system according to the preferred embodiment of the invention. First, in step 502, an in-phase signal and a quadrature signal of an audio signal are received. Next, in step 504, the in-phase signal and the quadrature signal are respectively sampled into a digital in-phase signal and a digital quadrature signal at a symbol rate. Then, in step 506, the digital in-phase signal and the digital quadrature signal are decoded to obtain a strobe signal and a data signal. Next, in step 508, multiple deinterleaved symbols are obtained in each timing according to the strobe signal and the data signal, and the deinterleaved symbols are sequentially and temporarily stored in a deinterleaving area of a FIFO buffer.

Then, in step 510, the deinterleaved symbols are expanded into corresponding multiple PCM symbols, and the PCM symbols are temporarily stored to a PCM area of the FIFO buffer at a time. Then, in step 512, the PCM symbols are outputted from the FIFO buffer at a local timing rate. Thereafter, in step 514, it is determined whether to enable a SRC function or not according to statuses of the symbols in the FIFO buffer every a constant time interval. In step 516, when the SRC function is disabled, the PCM symbols are outputted at the local timing rate. In step 518, when the SRC function is enabled, the PCM symbols are interpolated to obtain multiple new PCM symbols, and the local timing rate outputs the new PCM symbols. The detailed principles of steps 514 and 518 have been described in the NICAM system 200, so detailed descriptions thereof will be omitted.

In the NICAM system and the SRC method thereof according to the embodiment of the invention, the SRC unit is attached after the FIFO buffer of the NICAM system, and the statuses of the symbols in the FIFO buffer are observed every a constant time interval to determine whether to enable the SRC function or not and thus to solve the possible overflow or underrun problem of the FIFO buffer. In addition, the NICAM system of the invention has omitted the VCXO, about 94% of area is saved under the 0.18-μm manufacturing processes and the cost can be greatly saved with respect to the conventional NICAM system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A near-instantaneously companded audio multiplex (NICAM) system, comprising:
    a NICAM deframer for receiving a strobe signal and a data signal, obtaining a plurality of deinterleaved symbols at each of a plurality of successive times according to the strobe signal and the data signal, and then expanding the deinterleaved symbols into a plurality of corresponding pulse code modulation (PCM) symbols;
    a first-in-first-out (FIFO) buffer for temporarily storing the deinterleaved symbols and the PCM symbols, and then sequentially outputting the PCM symbols at a local timing rate; and
    a symbol rate conversion (SRC) unit, which is coupled to the FIFO buffer and determines whether to enable a SRC function or not according to statuses of the symbols in the FIFO buffer every one constant time interval, wherein:
    the SRC unit outputs the PCM symbols at the local timing rate when the SRC function is disabled; and
    when the SRC function is enabled, the SRC unit interpolates the PCM symbols to obtain a plurality of new PCM symbols and outputs the new PCM symbols at the local timing rate.

2. The system according to claim 1, further comprising:
    a first matched filter for receiving an in-phase signal in an audio signal;
    a second matched filter for receiving a quadrature signal in the audio signal;
    a symbol timing recovery unit, which is coupled to the first matched filter and the second matched filter and respectively samples the in-phase signal and the quadrature signal into a digital in-phase signal and a digital quadrature signal at a symbol rate; and
    a differential quadrature phase shift keying (DQPSK) decoder for decoding the digital in-phase signal and the digital quadrature signal to obtain the strobe signal and the data signal, respectively.

3. The system according to claim 1, wherein the FIFO buffer comprises a deinterleaving area and a PCM area, the deinterleaved symbols are temporarily stored in the deinterleaving area, and the PCM symbols are temporarily stored in the PCM area.

4. The system according to claim 3, wherein the NICAM deframer comprises:
    a deinterleaving unit for obtaining the deinterleaved symbols at each of the plurality of successive times according to the strobe signal and the data signal and sequentially temporarily storing the deinterleaved symbols in the deinterleaving area;
    a parity checking unit for checking the deinterleaved symbols; and
    an expanding unit for expanding the deinterleaved symbols into the corresponding PCM symbols and temporarily storing the PCM symbols together in a PCM area of the FIFO buffer.

5. The system according to claim 4, wherein the SRC unit determines whether to enable the SRC function or not according to the statuses of the deinterleaved symbols in the deinterleaving area every constant time interval.

6. The system according to claim 5, wherein when an address stored with the deinterleaved symbols in the deinterleaving area every constant time interval is a predetermined address, the SRC function is disabled and the SRC unit outputs the PCM symbols at the local timing rate.

7. The system according to claim 6, wherein when the address stored with the deinterleaved symbols in the deinterleaving area every constant time interval exceeds an upper-bound address higher than the predetermined address, the SRC function is enabled, the SRC unit interpolates the PCM symbols to obtain the new PCM symbols fewer than the PCM symbols, and the SRC unit outputs the new PCM symbols at the local timing rate.

8. The system according to claim 6, wherein when the address stored with the deinterleaved symbols in the deinterleaving area every constant time interval does not reach a lower-bound address lower than the predetermined address, the SRC function is enabled, the SRC unit interpolates the PCM symbols to obtain the new PCM symbols more than the PCM symbols, and the SRC unit outputs the new PCM symbols at the local timing rate.

9. The system according to claim 4, wherein the SRC unit determines whether to enable the SRC function or not according to a total data length of the deinterleaved symbols and the PCM symbols in the FIFO buffer every constant time interval.

10. The system according to claim 9, wherein when the total data length of the deinterleaved symbols and the PCM symbols in the FIFO buffer every constant time interval is a predetermined data length, the SRC function is disabled, and the SRC unit outputs the PCM symbols at the local timing rate.

11. The system according to claim 10, wherein when the total data length of the deinterleaved symbols and the PCM symbols in the FIFO buffer every constant time interval exceeds an upper-bound data length longer than the predetermined data length, the SRC function is enabled, the SRC unit interpolates the PCM symbols to obtain the new PCM symbols fewer than the PCM symbols, and the SRC unit outputs the new PCM symbols at the local timing rate.

12. The system according to claim 10, wherein when the total data length of the deinterleaved symbols and the PCM symbols in the FIFO buffer every constant time interval does not reach a lower-bound data length shorter than the predetermined data length, the SRC function is enabled, the SRC unit interpolates the PCM symbols to obtain the new PCM symbols more than the PCM symbols, and the SRC unit outputs the new PCM symbols at the local timing rate.

13. A symbol rate conversion (SRC) method of a near-instantaneously companded audio multiplex (NICAM) system, the method comprising the steps of:
   receiving a strobe signal and a data signal;
   obtaining a plurality of deinterleaved symbols according to the strobe signal and the data signal at each of the plurality of successive times, and sequentially storing the deinterleaved symbols in a deinterleaving area of a first-in-first-out (FIFO) buffer;
   expanding the deinterleaved symbols into a plurality of corresponding pulse code modulation (PCM) symbols, and temporarily storing the PCM symbols together in a PCM area of the FIFO buffer;
   outputting the PCM symbols from the FIFO buffer at a local timing rate;
   determining whether to enable a SRC function according to statuses of the symbols in the FIFO buffer every one constant time interval;
   outputting the PCM symbols at the local timing rate when the SRC function is disabled; and
   interpolating the PCM symbols to obtain a plurality of new PCM symbols when the SRC function is enabled, and outputting the new PCM symbols at the local timing rate.

14. The method according to claim 13, further comprising the steps of:
   receiving an in-phase signal and a quadrature signal in an audio signal;
   respectively sampling the in-phase signal and the quadrature signal into a digital in-phase signal and a digital quadrature signal at a symbol rate; and
   decoding the digital in-phase signal and the digital quadrature signal into the strobe signal and the data signal, respectively.

15. The method according to claim 14, wherein whether the SRC function is enabled or not is determined according to the statuses of the deinterleaved symbols in the deinterleaving area every constant time interval.

16. The method according to claim 15, further comprising the step of:
   disabling the SRC function when an address stored with the deinterleaved symbols in the deinterleaving area every constant time interval is a predetermined address, and outputting the PCM symbols at the local timing rate.

17. The method according to claim 16, further comprising the step of:
   enabling the SRC function to interpolate the PCM symbols to obtain the new PCM symbols when the address stored with the deinterleaved symbols in the deinterleaving area every constant time interval exceeds an upper-bound address higher than the predetermined address, and outputting the new PCM symbols, which are fewer than the PCM symbols, at the local timing rate.

18. The method according to claim 16, further comprising the step of:
   enabling the SRC function to interpolate the PCM symbols to obtain the new PCM symbols when the address stored with the deinterleaved symbols in the deinterleaving area every constant time interval does not reach a lower-bound address lower than the predetermined address, and outputting the new PCM symbols, which are more than the PCM symbols, at the local timing rate.

19. The method according to claim 14, wherein whether the SRC function is enabled or not is determined according to a total data length of the deinterleaved symbols and the PCM symbols in the FIFO buffer every constant time interval.

20. The method according to claim 19, further comprising the step of:
   disabling the SRC function when the total data length of the deinterleaved symbols and the PCM symbols in the FIFO buffer is a predetermined data length every constant time interval, and outputting the PCM symbols at the local timing rate.

21. The method according to claim 20, further comprising the step of:

enabling the SRC function to interpolate the PCM symbols to obtain the new PCM symbols when the total data length of the deinterleaved symbols and the PCM symbols in the FIFO buffer every constant time interval exceeds an upper-bound data length longer than the predetermined data length, and outputting the new PCM symbols, which are fewer than the PCM symbols, at the local timing rate.

22. The method according to claim 20, further comprising the step of:

enabling the SRC function to interpolate the PCM symbols to obtain the new PCM symbols when the total data length of the deinterleaved symbols and the PCM symbols in the FIFO buffer every constant time interval does not reach a lower-bound data length shorter than the predetermined data length, and outputting the new PCM symbols, which are more than the PCM symbols, at the local timing rate.

* * * * *